Nov. 14, 1967 — W. W. MOUNT — 3,352,160
CORING APPARATUS
Filed July 21, 1965 — 4 Sheets-Sheet 1
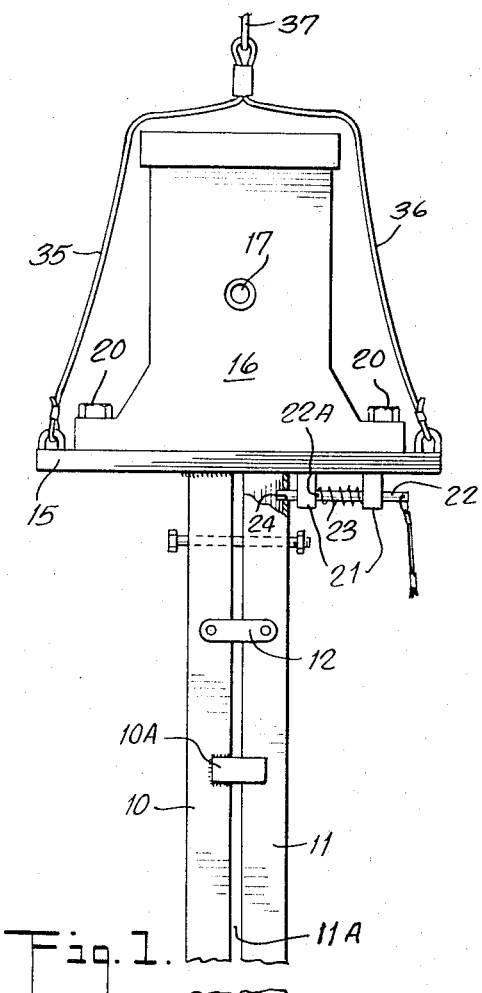
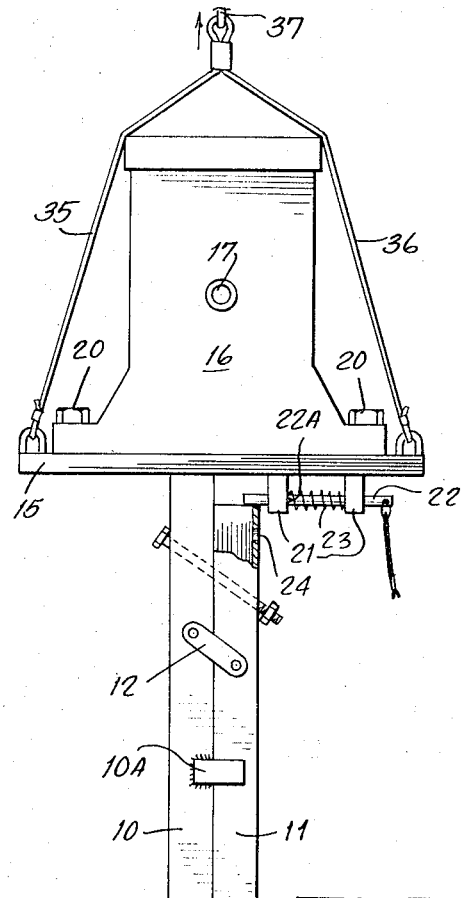
INVENTOR.
WADSWORTH W. MOUNT
BY
ATTORNEY

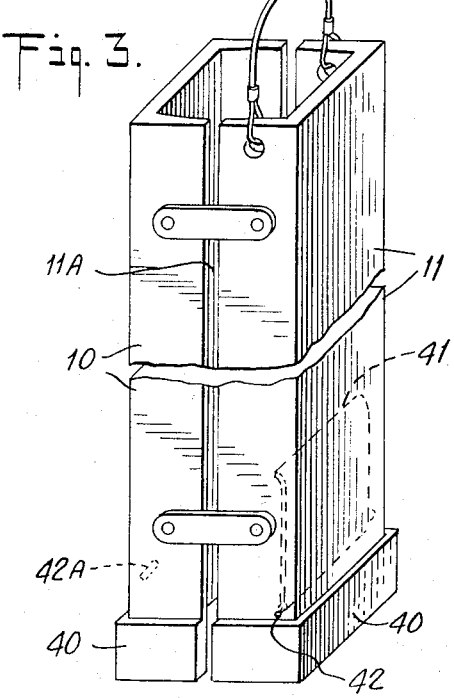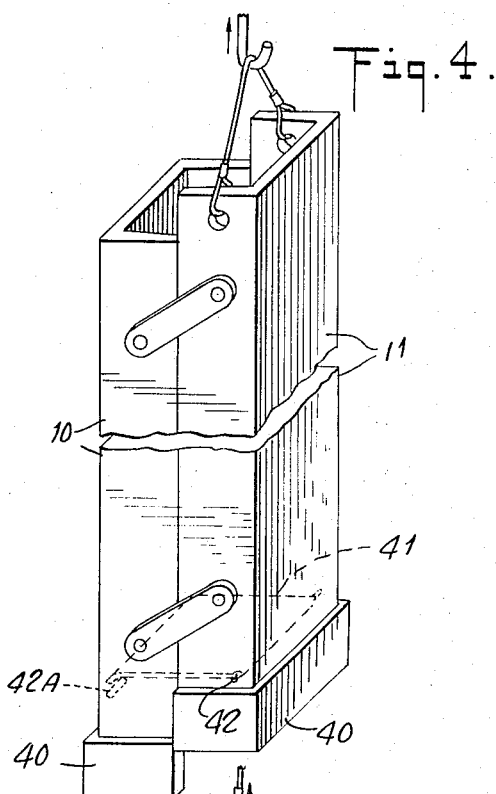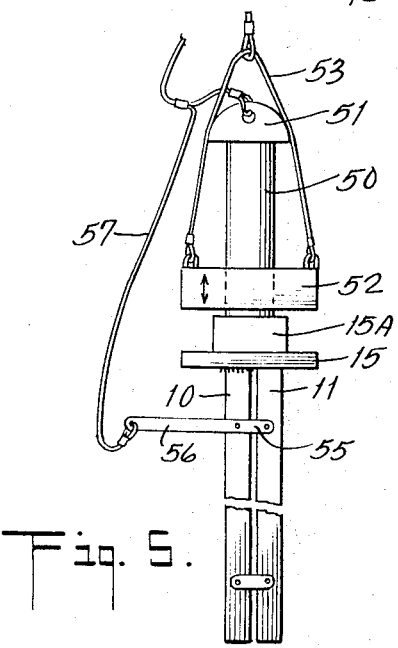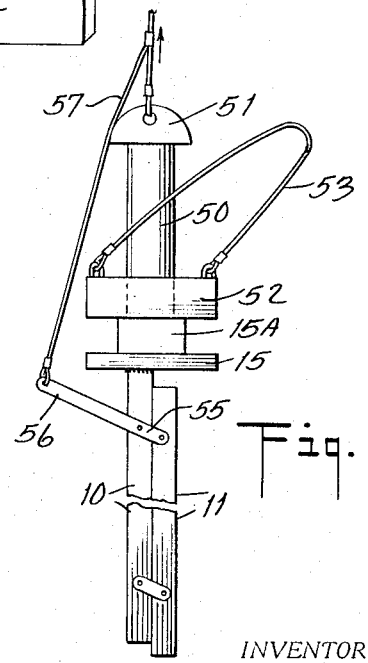

Nov. 14, 1967 W. W. MOUNT 3,352,160
CORING APPARATUS

Filed July 21, 1965 4 Sheets-Sheet 3

INVENTOR.
WADSWORTH W. MOUNT
BY
ATTORNEY

Nov. 14, 1967 W. W. MOUNT 3,352,160
CORING APPARATUS

Filed July 21, 1965 4 Sheets-Sheet 4

INVENTOR.
WADSWORTH W. MOUNT
BY
ATTORNEY 3,352,160
CORING APPARATUS
Wadsworth W. Mount, Mountain Ave., Warren Township,
Somerset County, N.J. 07060
Filed July 21, 1965, Ser. No. 473,657
3 Claims. (Cl. 73—425.2)

ABSTRACT OF THE DISCLOSURE

A device for obtaining a core sample from a loose formation such as sand on a beach or under water, comprising a plurality of elongated angular members positioned to form an elongated core receptacle between them, a plurality of links each pivotally mounted at each end on an adjacent member to hold the members in spaced-apart relation in one position, in which the receptacle is driven into the sand, and moving the members toward one another when the members are longitudinally moved with respect to one another to close the receptacle.

---

This invention relates to corers and has special reference to such as are intended to be driven or otherwise inserted into sand or other loose formations to obtain a true sample of the formation.

One object of the invention is to provide a novel corer which will enable the operator to secure a core of greater length than has hitherto been considered possible and one which is so constructed as to permit the core to be removed as a complete whole.

Another object is to provide a core box or container which is susceptible of being inserted into sand or loose formations in an open position and of being closed to contain the core or sample of the formation until it is retrieved and ready to be discharged for study and analysis.

Another object is to provide means for locking the corer in open position as it is being inserted into the formation and locking the corer in closed position when it is being extracted.

Other objects and advantages of this invention will be apparent from the following description and by reference to the drawings in which:

Brief description of the drawings

FIG. 1 is an elevation of a box type coring device embodying this invention and in which the box corer is shown in open position ready to be driven into the formation of which a core sample is desired.

FIG. 2 is a view corresponding to FIG. 1 but in which the box corer is shown in closed position.

FIG. 3 is a perspective view of the box corer on a larger scale with the core catcher in an open position and details of an outside-clearance form of cutting edge formed at the bottom.

FIG. 4 corresponds to FIG. 3 but shows the box corer closed and the core catcher in a closed position.

FIG. 5 corresponds to FIG. 3 and illustrates a modified structure which also embodies my invention but is adapted to be hammer driven.

FIG. 6 is another view of the structure of FIG. 5 in which the core box is closed, aided by the action of a hinge link lever.

Description of the preferred embodiments

Figure 7:
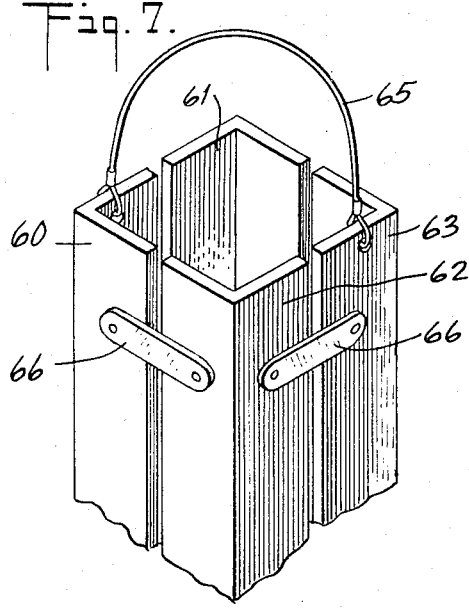
FIGS. 7, 8, 9, 10 and 11 are fragmentary views showing several different structural shapes which the core box may assume without departing from my invention.

Referring first to FIGS. 1 and 2, the core box is composed of two channel shaped members 10 and 11 which are interconnected by hinge links 12. The channel 10 is welded to the bottom of head plate 15 and a vibrator 16 is fastened to the head plate 15 and has an air intake 17 to which a compressed air hose, not shown, may be attached. Head plate 15 may be bolted or otherwise securely fastened to the vibrator 16, the arrangement being such that by removing the bolts 20 the vibrator 16 may be removed and replaced by a vibrator of a different, well known character, which for example may be electrically operated.

The channel shaped parts 10 and 11 of the core box may be interconnected by any required number of hinge links 12, the arrangement being such that one of the parts 11 may be moved a limited distance downward and inward with reference to the part 10, thereby closing the box as shown in FIG. 2 and thus clamping the entrapped core longitudinally over the entire length. This action also tends to reduce the cross section of the corer so that it may more readily break away from external earth friction when being pulled out.

Figure 12:
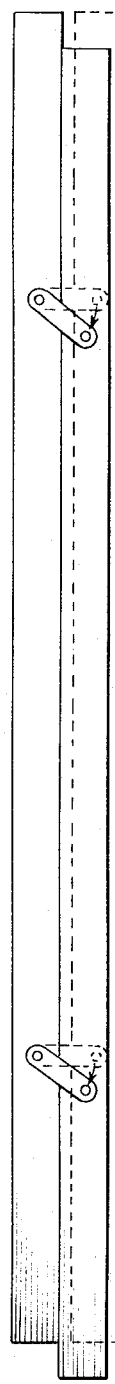
FIG. 12 is a diagram illustrating the motion of the hinge links when the corer is changed from its open to its closed position.

The position of the hinge links will be well understood by reference to FIG. 12, in which the broken lines represent the corer in open position and the full lines show the corer closed. The right-hand ends of the hinge links move through arcs of a circle and the right-hand corer members move downward and inward until the corer members are in contact and the corer is thus closed. While the links are shown on the adjacent side of the corer, it will be understood that similar links are mounted on the opposite side of the corer. The links are adapted to hold the members of the corer in either open or closed position, and while only two links are shown in FIGS. 1 and 2, a number may be employed to keep the parts of the corer from becoming offset. In fact, it may be desirable to weld or otherwise attach guide lugs 10A to one of the corer members and extending over the other member, as shown in FIGS. 1 and 2.

Figure 13:
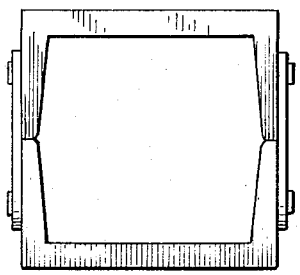
FIG. 13 is a sectional elevation of the corer indicating the two members of the corer when they are in closed position with their edges in contact.
Figure 14:
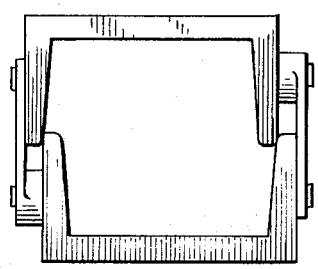
FIG. 14 corresponds to FIG. 13 but shows a modified structure in which the members of the corer overlap in the closed position and the links are modified to accommodate this arrangement.
Figure 15:
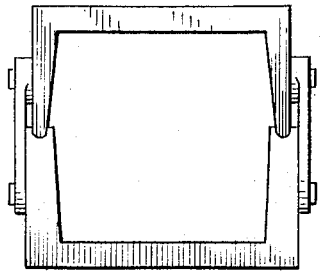
FIG. 15 corresponds to FIG. 14 but shows a structure in which the corer members form a tongue-and-groove contact when closed.
Figure 16:
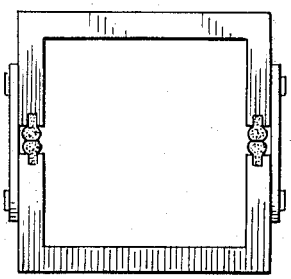
FIG. 16 is another modification in which a resilient edge is provided on at least one of the members of the corer so as to insure a tight joint when the corer is in closed position.

The edges of the cooperating corer members are in contact in the closed position, as shown in FIG. 13, but a special joint such as a tongue and groove may be formed in the edges if desired, or the hinge links may be formed so as to permit the edges of one channel to overlap the edges of the other channel when closed in an offset engagement. The edges may also be equipped with resilient material. The arrangement used will be the one best fitted to lose as little sediment as practicable when the corer goes from open to closed position and while the apparatus is being hoisted to the deck or working platform. These alternative structures are shown in FIGS. 14, 15 and 16.

When the core box is open, as shown in FIG. 1, the bottom ends are in one plane, the channel 11 being in contact with the head plate 15 under the vibrator but not attached thereto, except by a lock composed of two blocks 21 through which a bolt 22 extends. A spring 23 surrounds the bolt between the blocks 21 and tends to force the bolt into a hole 24 near the top of channel 11 by pressing against pin 22A through bolt 22. When the core box is open, as shown in FIG. 1, and the lock is set with the bolt extending into the hole 24, the parts 10 and 11 will maintain the position shown in FIG. 1, with a small opening 11A between the channels, and the lower ends of the two parts will rest in a single plane, the device then being in position to be driven into the formation of which a core sample is desired. This position will be substantially retained on driving whether or not the parts are locked in this open position.

On channel 11, near the bottom, a flat plate core catcher 30 is pivoted above one of the internal clearance and cutting edge enlargements 31, and in the open position as shown in FIG. 1, it lies parallel to the wide inside surface of the channel 11 (or alternatively of channel 10) and does not interfere with the box corer being injected into the formation.

The inside clearances of the internal, opposed cutting edge enlargements 31 and the longitudinal side openings 11A so reduce inside friction that the core obtained is substantially as long as the distance the corer is inserted into the formation. The internal cutting edge enlargements 31 also act as spacers to protect the core catcher 30 from damage and to support the core catcher when the weight of the entrapped core bears on it on retraction. In some formations the clamping action alone is sufficient to hold the core on extraction, without the use of a core catcher or of an internal clearance on the cutting edges.

When compressed air is admitted through 17, the vibrator 16 is operated and the vibrations thus produced are transmitted through the core box channels 10 and 11 which then enter the formation at a rapid rate if the ground is sand or other loose formation. The longitudinal openings between channels 10 and 11 permit constant lubrication when the sand is wet so that the core being taken does not lock with internal friction and stop at some point as the corer is inserted.

It will be understood that the box corer may be made of any desired length, and when the desired depth has been reached, bolt 22 is retracted and the core channel 11 then drops to the position shown in FIG. 2 as the entire assembly is raised. The bolt 22 is then released and occupies the position shown in FIG. 2 extending above the end of channel 11 and holding the core box in a closed position.

This closed position will be attained by hoisting up on the vibrator through cables 35 and 36, which are coupled to a hoisting cable 37. Since the channel 10 is securely affixed to the plate 15 by welding or otherwise, the upward movement of the vibrator and plate 15 produces an upward movement of the channel 10 and causes the two channels 10 and 11 to come together to assume their closed position by means of the hinge links 12, and the core catcher 30 will act like a check valve and assume its closed position, as shown in FIG. 2. The core box is now filled to the level determined by the depth to which the channel coring apparatus has been inserted in the formation.

The locking bolt 22 is a safety feature which may or may not be used; as the channels will stay in the open position of FIG. 1 when the corer is being inserted into the earth formation, and the channels will almost immediately assume the closed position of FIG. 2 when the assembly is being pulled back out of the formation.

The cable 37 may be attached to a derrick or hoist and a strong upward pull exerted to extract the corer with its core from the formation. This operation would normally require a very great force to extract the corer and core, but this may be greatly assisted by operating the vibrator while the outward pull is being exerted, and moreover the parts of the corer come together and thus reduce its size. The details of the bottom end of the channel box corer are shown in perspective in FIGS. 3 and 4, to which specific reference may now be had.

As here shown, the lower ends of the box channels 10 and 11 are provided with an external flange 40 which constitutes a cutter that is slightly larger than the box channels. The core catcher, which acts like a check valve, as already explained, has the form of a plate 41 mounted on a hinge pin 42 and of a size to completely close the opening in the bottom of the core box when the parts are closed, as shown in FIGS. 2 and 4, and the plate 41 comes to bear on the stop 42A of FIGS. 3 and 4 or on the opposite cutting edge enlargement 31 of FIG. 2.

When the corer is hoisted out of the formation, it may be deposited on the deck of a ship if the device is to be used below water level, or on a suitable platform where the parts may be separated and the core removed for study and investigation.

Referring now to FIGS. 5 and 6, in which like parts are designated by the same reference characters, as here shown the plate 15 has firmly secured to it a guide extension 50 having an enlarged cap 51 at the top, and mounted to slide on the extension 50 is a heavy weight 52 which may be raised to the cap 51 by cable loop 53 and then dropped to exert a hammer blow on the head plate 15 through the driving collar 15A. In this modification the box channels 10 and 11 are interconnected near the top by a link 55 having a lever extension 56. This lever has a control cable 57 so that when it is pulled upwardly, the lever acts, as shown in FIG. 6, to close the channel box when a positive closing force is desired.

This action would occur when the operator is satisfied that the core box has penetrated the formation to the desired depth and is starting to extract the coring apparatus and its entrapped core.

The arrangement of FIGS. 5 and 6 is particularly adapted for use in harder formations where the hammer action is necessary to drive the core box into the formation.

Figure 8:
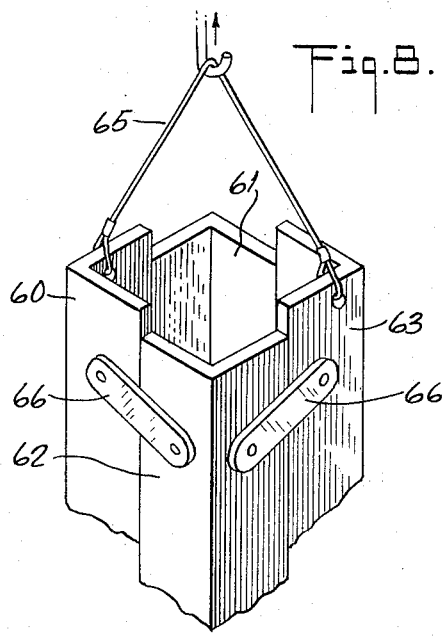

While the structures shown in FIGS. 1 to 6, inclusive, include two channel members, as clearly shown in FIGS. 3 and 4, the box corer may be composed of more than two parts, as shown in FIGS. 7 and 8. Here the box corer is composed of four angle members 60, 61, 62 and 63. A cable 65 may be connected to angle members 60 and 63, which are coupled to members 61 and 62 by hinge links 66 which permit the box to be opened as shown in FIG. 7, or closed as shown in FIG. 8, by cable 65 pulling upward on two opposed members 60 and 63.

Figure 9:
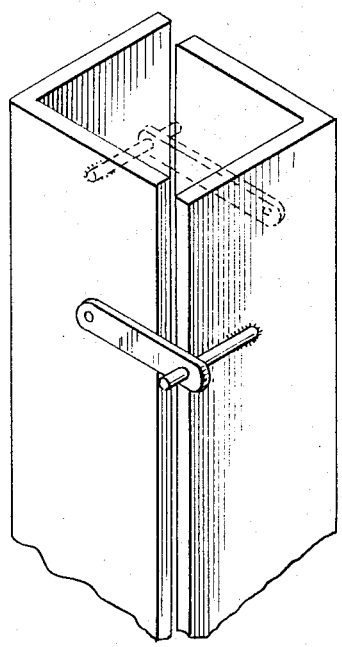
Figure 10:
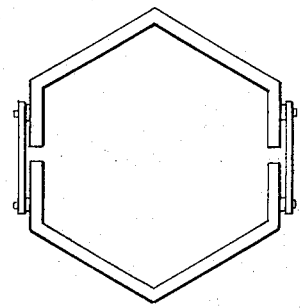
Figure 11:
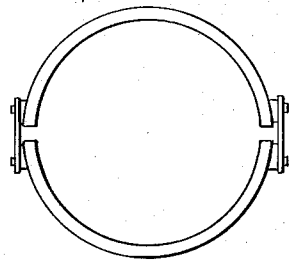

It will be understood that the core box may be made up of two angle irons, as shown in FIG. 9, or two hexagonal members, as shown in FIG. 10, or two semi circular members, as shown in FIG. 11. The principle of operation is the same in any case.

I believe that the channel members, as shown in FIGS. 1 to 6, inclusive, are most satisfactory because of their simplicity, but the invention is not limited in this respect.

I claim:

1. A device for obtaining a core sample comprising a plurality of elongated angular members positioned to form an elongated core receptacle between them, a plurality of links each pivotally mounted at each end on an adjacent member to hold the members in spaced-apart relation in one position and moving the members toward one another when the members are longitudinally moved with respect to one another to close the receptacle.

2. The device of claim 1 including means for forcing the core receptacle into the formation to be sampled when the members are in spaced-apart relation.

3. The device of claim 1 in which at least one set of links is located near each end of the receptacle to hold the members in spaced-apart relation throughout their entire length.

References Cited

UNITED STATES PATENTS

| | | | |
|---|---|---|---|
| 846,157 | 3/1907 | Stephens | 294—104 X |
| 1,317,291 | 9/1919 | Heckman | 294—104 |
| 1,789,246 | 1/1931 | Meloy | 73—425.2 |
| 2,650,068 | 8/1953 | Rand | 176—6 |
| 3,194,326 | 6/1965 | Bodine | 175—5 |

FOREIGN PATENTS 479,001  3/1953  Italy.

LOUIS R. PRINCE, *Primary Examiner.*

S. C. SWISHER, *Assistant Examiner.*